United States Patent
Jayapalan et al.

(10) Patent No.: US 10,084,916 B2
(45) Date of Patent: *Sep. 25, 2018

(54) EDGE INJECTED SPEECH IN ELECTRONIC COMMUNICATIONS

(71) Applicant: United Services Automobile Association (USAA), San Antonio, TX (US)

(72) Inventors: Vijay Jayapalan, San Antonio, TX (US); Greg Yarbrough, San Antonio, TX (US); Eric Smith, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,607

(22) Filed: Jan. 18, 2018

(65) Prior Publication Data

US 2018/0146092 A1    May 24, 2018

Related U.S. Application Data

(63) Continuation of application No. 15/474,667, filed on Mar. 30, 2017, now Pat. No. 9,912,811, which is a
(Continued)

(51) Int. Cl.
*H04M 3/42* (2006.01)
*H04M 3/51* (2006.01)
*H04M 3/523* (2006.01)
*G10L 13/04* (2013.01)
*G10L 13/033* (2013.01)

(52) U.S. Cl.
CPC ....... *H04M 3/5166* (2013.01); *G10L 13/0335* (2013.01); *G10L 13/043* (2013.01);
(Continued)

(58) Field of Classification Search
CPC .............. G10L 13/0335; G10L 13/043; G10L 2021/0135; H04M 3/42221;
(Continued)

(56) References Cited

U.S. PATENT DOCUMENTS

| 5,544,232 | A  | 8/1996  | Baker et al. |
| 9,172,805 | B1 | 10/2015 | Jayapalan |
| 9,648,161 | B2 | 5/2017  | Jayapalan |
| 2003/0007612 | A1 | 1/2003 | Garcia |
| 2003/0172185 | A1 | 9/2003 | Dezonno |
| 2006/0020471 | A1 | 1/2006 | Ju |

(Continued)

FOREIGN PATENT DOCUMENTS

| WO | WO2011000934 | 1/2011 |
| WO | WO2016/89463 | 6/2016 |

OTHER PUBLICATIONS

Punte, International Search Report and Written Opinion of the International Searching Authority, International application No. PCT/US2015/050448, dated Jan. 4, 2016, 12 pages.

(Continued)

*Primary Examiner* — Harry S Hong
(74) *Attorney, Agent, or Firm* — Fish & Richardson P.C.

(57) ABSTRACT

Methods, systems, and apparatus, including computer programs encoded on a computer storage medium, for receiving an input from an agent during a call with a caller where the input directs one or more processors to inject a recorded statement in the agent's voice into the call, and where the recorded statement in the agent's voice is stored in a computer-readable file. Obtaining the recorded statement in the agent's voice based on data associated with the input and in response to receiving the input. And causing the recorded statement in the agent's voice to be inserted into a media stream of the call.

20 Claims, 7 Drawing Sheets

Related U.S. Application Data continuation of application No. 14/856,033, filed on Sep. 16, 2015, now Pat. No. 9,648,161, which is a continuation of application No. 14/558,893, filed on Dec. 3, 2014, now Pat. No. 9,172,805.

(52) U.S. Cl.
CPC .... *H04M 3/5183* (2013.01); *H04M 2203/255* (2013.01); *H04M 2203/306* (2013.01)

(58) Field of Classification Search
CPC ............. H04M 3/4936; H04M 3/5166; H04M 3/5183; H04M 2201/39; H04M 2203/255; H04M 2203/306
USPC ............ 379/201.02, 265.01, 265.02, 265.07, 379/265.09; 455/414.1
See application file for complete search history.

(56) References Cited

U.S. PATENT DOCUMENTS

| | | |
|---|---|---|
| 2006/0067252 A1 | 3/2006 | John et al. |
| 2007/0223668 A1 | 9/2007 | Blumenfeld et al. |
| 2011/0119138 A1 | 5/2011 | Rakers et al. |
| 2011/0124323 A1 | 5/2011 | Selph |
| 2013/0003943 A1 | 1/2013 | Munns et al. |
| 2013/0039482 A1 | 2/2013 | Selph et al. |
| 2013/0294593 A1 | 11/2013 | Xing et al. |
| 2016/0165045 A1 | 6/2016 | Jayapalan |
| 2017/0208175 A1 | 7/2017 | Jayapalan |

OTHER PUBLICATIONS

International Preliminary Report on Patentability in International Application No. PCT/US2015/050448, dated Jun. 6, 2017, 8 pages.

EDGE INJECTED SPEECH IN ELECTRONIC COMMUNICATIONS

CROSS-REFERENCE TO RELATED APPLICATIONS

This application is a continuation of U.S. patent application Ser. No. 15/474,667, filed Mar. 30, 2017, which is continuation of U.S. patent application Ser. No. 14/856,033, entitled "Edge Injected Speech in Electronic Communications," filed Sep. 16, 2015, now U.S. Pat. No. 9,648,161, which is a continuation of U.S. patent application Ser. No. 14/558,893, entitled "Edge Injected Speech in Call Centers" filed Dec. 3, 2014, now U.S. Pat. No. 9,172,805, all of which are incorporated herein by reference in their entirety.

BACKGROUND

Call centers are used to provide, among other services, customer support, technical support, and product/service ordering services to callers. Call center customer service representatives (CSRs) may handle on the order of ten to twenty thousand calls per year, or thirty to sixty calls per day. Moreover, content of each call that a CSR answers is repeated in all or most call center calls.

SUMMARY

This specification relates to injecting speech into call center calls.

Implementations of the present disclosure generally provide a call center agent (e.g., a CSR) with the ability to inject stored speech into a media stream of an ongoing call, and may, thereby, alleviate the agent of the need to continuously repeat similar statements. More specifically, injected speech is in the agent's own voice, as a recorded statement by the agent or by modulating computer generated speech to mimic the agent's voice. Consequently, transitions between injected, recorded speech and actual, real-time speech by the agent appear, to a caller, as a seamless conversation; when in-fact the agent is only uttering portions of the conversation and a computing system is injecting other portions.

In general, innovative aspects of the subject matter described in this specification can be embodied in methods that include actions of receiving an input from an agent during a call with a caller where the input directs one or more processors to inject a recorded statement in the agent's voice into the call, and where the recorded statement in the agent's voice is stored in a computer-readable file. Obtaining the recorded statement in the agent's voice based on data associated with the input and in response to receiving the input, and causing the recorded statement in the agent's voice to be inserted into a media stream of the call. Other implementations of this aspect include corresponding systems, apparatus, and computer programs, configured to perform the actions of the methods, encoded on computer storage devices.

These and other implementations can each optionally include one or more of the following features. The data associated with the input may include data identifying the agent from whom the input was received. Obtaining the recorded statement in the agent's voice may include the operations of identifying the recorded statement in the agent's voice from among a plurality of recorded statements recorded in voices of agents other than the agent, and selecting the identified recorded statement in the agent's voice to be inserted into the media stream of the call.

The data associated with the input may include data identifying a type of recorded statement in the agent's voice. Obtaining the recorded statement in the agent's voice may include identifying the recorded statement in the agent's voice from among a plurality of recorded statements in the agent's voice based on the data identifying the type of recorded statement, and selecting the identified recorded statement in the agent's voice to be inserted into the media stream of the call.

The data associated with the input includes call data identifying another call with another caller into which the recorded statement in the agent's voice is to be inserted, and causing the recorded statement in the agent's voice to be inserted into a media stream of a call may include causing the recorded statement in the agent's voice to be inserted into a media stream of the other call.

The operations may include providing a graphical user interface including a plurality of options for inserting speech into call center calls for display to the agent, where receiving the input from the agent may include receiving the input via the graphical user interface. The data associated with the input may be generated based on one or more options of the plurality of options selected by the agent.

In general, other innovative aspects of the subject matter described in this specification can be embodied in methods that include actions of receiving an input from an agent during a call with a caller where the input directs one or more processors to inject a recorded statement in the agent's voice into the call. Obtaining a voice modulated statement based on data associated with the input and in response to receiving the input, where the voice modulated statement is computer generated speech of the statement modulated with the agent's voice. And causing the voice modulated statement to be inserted into a media stream of the call. Other implementations of this aspect include corresponding systems, apparatus, and computer programs, configured to perform the actions of the methods, encoded on computer storage devices.

The data associated with the input may include data identifying the call center agent from whom the input was received. Obtaining the voice modulated statement may include identifying voice modulation data associated with the agent's voice from among a plurality of voice modulation data associated voices of agents other than the agent, and selecting the voice modulation data associated with the agent's voice with which to modulate the computer generated speech of the statement. The voice modulation data associated with the agent's voice includes a plurality of phoneme combinations of the agent's voice.

The data associated with the input may include a textual representation of the statement. Obtaining the voice modulated statement may include obtaining the computer generated speech of the statement from a text-to-speech conversion of the textual representation of the statement, and causing the computer generated speech of the statement from the text-to-speech conversion to be modulated with the agent's voice.

The data associated with the input may include call data identifying another call with another caller into which the voice modulated statement is to be inserted, and causing the voice modulated statement to be inserted into a media stream of a call may include causing the voice modulated statement in the agent's voice to be inserted into a media stream of the other call.

The operations may include providing a graphical user interface including a plurality of options for inserting speech into call center calls for display to the agent, and receiving the input from the agent may include receiving the input via the graphical user interface. The data associated with the input may be generated based on one or more options of the plurality of options selected by the agent.

Particular implementations of the subject matter described in this specification can be implemented so as to realize one or more of the following advantages. Implementations may ease the burden on CSR of repeating common statements in tens of thousands of calls per year. Some implementations may reduce caller wait times by permitting CSR handle portions of two or more calls concurrently. Some implementations may create a more consistent call center experience for callers.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure generally provide a call center agent (e.g., a CSR) with the ability to inject stored speech into a media stream of an ongoing call, and may, thereby, alleviate the agent of the need to continuously repeat similar statements. More specifically, injected speech is in the agent's own voice, as a recorded statement by the agent or by modulating computer generated speech to mimic the agent's voice. Consequently, transitions between injected, recorded speech and actual, real-time speech by the agent appear, to a caller, as a seamless conversation; when in-fact the agent is only uttering portions of the conversation and a computing system is injecting other portions.

Implementations of the present disclosure will be discussed in further detail with reference to an example context. The example context includes a financial services call center. It is appreciated, however, that implementations of the present disclosure can be realized in other appropriate contexts (e.g., technical support call centers, customer service call centers, telemarketing call centers, and conference calling services). In addition, implementations of the present disclosure will be discussed in reference to "calls" (e.g., telephone calls) made to and from a call center. Although discussed in reference to the common telephone "call;" the implementations described may be performed on any appropriate real-time duplex communication media stream, which may be used to contact a CSR at a call center. For example, implementations described herein may be performed on any electronic communications between a CSR and a caller including, but not limited to, telephone, video telephone, chat (e.g., IM, Jabber), video chat (e.g., Skype, Facetime), internet based meetings (e.g., WebEx), and conference call systems.

Figure 1:
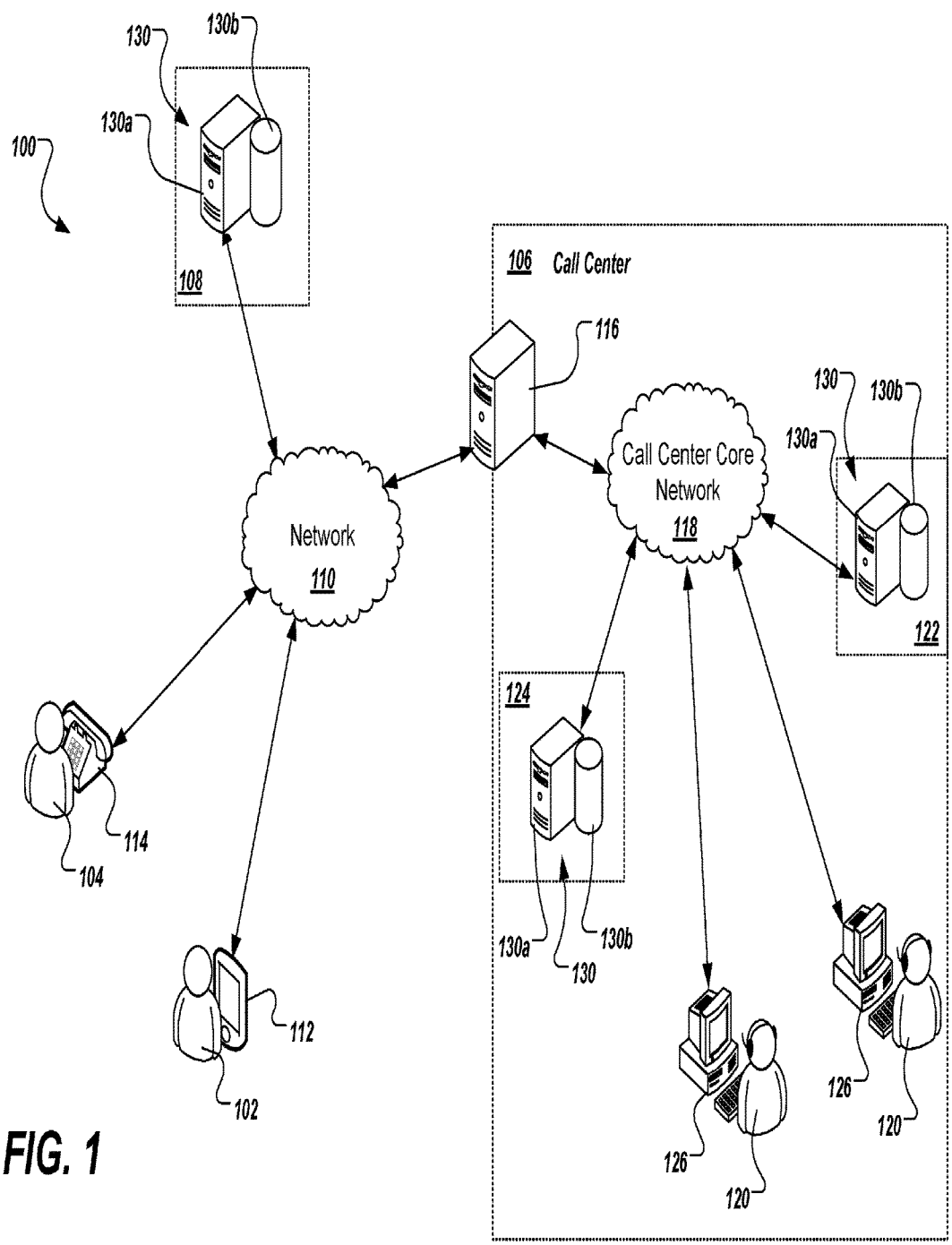
FIG. 1 depicts an example system in accordance with implementations of the present disclosure.

FIG. 1 depicts an example system 100 that can execute implementations of the present disclosure. The example system 100 is illustrated in a call center environment, including callers 102, 104, a call center 106, and one or more external systems 108. The call center 106 may be either an inbound, outbound, or blended call center, for example, a customer service center, a product or service order center, a technical support center, a telephone answering service, or a telemarketing center. Callers 102, 104 may be, for example, customers or potential customers seeking to purchase or support for various products or services. Callers 102, 104 also may be potential prospects whom an organization (e.g., business, non-profit organization, or political organization) would like to contact.

Callers 102, 104 communicate with call center 106 using respective communication devices 112, 114 over network 110. In some examples, communication devices 112, 114 can each include various forms of communication devices including, but not limited to, a public switched telephone network (PSTN) telephone, a voice over IP (VoIP) telephone, a video phone, a handheld computer, a cellular telephone, a smart phone, an enhanced general packet radio service (EGPRS) mobile phone, or other appropriate communication devices. The network 110 can include a large network or combination of networks, such as a PSTN, a local area network (LAN), wide area network (WAN), the Internet, a cellular network, a satellite network, one or more wireless access points, or a combination thereof connecting any number of mobile clients, fixed clients, and servers. In some examples, the network 110 can be referred to as an upper-level network.

Call center 106 may include, for example, one or more network edge devices 116, a call center network 118, an automated menu system 122, an speech injection system 124, agents 120 (e.g., CSRs), and agent workstations 126. In some examples, network edge device 116 is a network device used to provide an entry point into a call center's 106 internal network (e.g., call center network 118) including, but not limited to, a server, a router, a switch, a gateway, or other appropriate network device or combination of network devices. In some examples, automated menu system 122 can include a touch-tone system, an interactive voice response system (IVR), or any other appropriate caller menu system or combination of automated caller menu systems.

Agents 120 may make and receive customer calls at workstations 126. In some examples, a workstation 126 can include one or more computing devices and one or more communication devices (e.g., similar to communication devices 112 and/or 114 described above). Computing devices can be any type of computing device with which an agent 120 can access information related to customer calls (e.g., customer account information, marketing information, call lists, technical support information, product information and/or service information). Computing devices may include, but are not limited to, one or more desktop computers, laptop computers, notebook computers, tablet computers, and other appropriate devices.

In some implementations, agents 120 and workstations 126 may not be physically located at the call center 106, but may be geographically remote from the call center 106. For example, Agents 120 may work from a home office and access call center network 118 over network 110 and via a virtual private network (VPN).

In some examples, external systems 108 are third-party operated systems to which one or more call center processing or data analysis operations can be outsourced by the call center 106. External system 108 may, for example, perform operations such as fraud analysis, speech injection services, voice-to-text services, and real-time call analytics.

External system 108, automated menu system 122, and speech injection system 124 include computing systems 130. The computing systems 130 can each include a computing device 130a and computer-readable memory provided as a persistent storage device 130b, and can represent various forms of server systems including, but not limited to a web server, an application server, a proxy server, a network server, or a server farm.

In some examples, implementations of the present disclosure may be performed by a speech injection application. A speech injection application may be stored at and executed by one or more computing systems 130 or workstations 126 such as, e.g., speech injection system 124. Generally, for the purpose of this disclosure, an example speech injection system will be referred to as operating on speech injection system 124. However, in some examples, a speech injection application may be stored at and executed by multiple computing systems 130 and/or workstations 126. For example, a speech injection application may include various modules stored on and executed by different computing systems 130 or workstations 126. For instance, user interface modules may be stored at and executed by workstations 126, and a framework module may be stored at and executed by computing systems 130 (e.g., speech injection system 124). In some implementations, a speech injection application may be one or more web-based applications accessed and executed via call center network 118 and network 110. For example, a speech injection system 124 may be external to the call center 106 (such as external system 108). In some examples, the speech injection system 124 may be part of the call center 106, but an agent 120 may be working from a home agent workstation 126 external to the call center.

Figure 2:
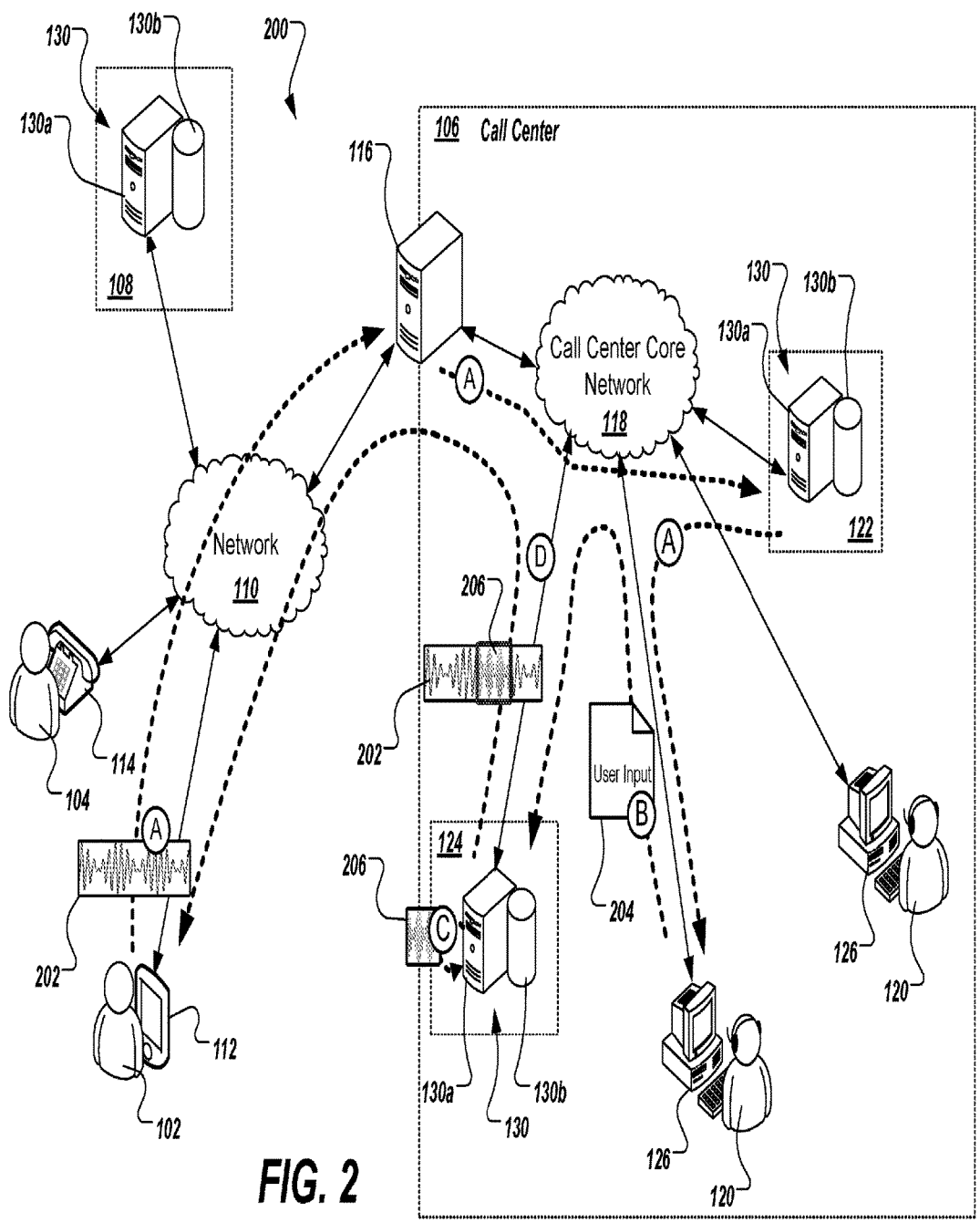
FIG. 2 depict an example speech injection process flow within the example system.

FIG. 2 depicts an example process flow for a speech injection process 200 within the example system 100. The process illustrated in FIG. 2 is an example process 200 performed by an example speech injection application operating on system 100. In this example, a call 202 is received at a call center 106, and the call 202 is transferred to a call center agent 120 through the call center network 118. During the course of the call 202, the speech injection system 124 receives an input 204 form an agent 120 to inject speech into the media stream of the call 202. The speech injection system 124 obtains a statement 206 in the agent's 120 voice according to the received input, and injects the statement 206 into the media stream of the call 202.

In more detail, during state (A), call center 106 receives a call 202 from caller 102, and transfers the call to an agent 120. For example, a call center's 106 network edge device 116 receives a customer call 202, passes the call 202 to the call center network 118, where the call 202 is processed by the computing systems 130 (e.g., automated menu system) within the call center network 118, and is ultimately transferred to agent 120. As noted above, the call 202 may be any appropriate real-time duplex communication media stream which may be used to contact a CSR (agent) at a call center. For example, the call 202 may be performed on any electronic communications between caller 102 and agent 120 including, but not limited to, telephone, video telephone, chat (e.g., IM, Jabber), video chat (e.g., Skype, Facetime), internet based meetings (e.g., WebEx), and conference call systems. In addition, the call may be a media stream of a multicast communication (e.g., a conference call).

During state (B), system 124 receive an input 204 from agent 120 to inject speech into the media stream of the call 202. The input 204 may be associated with additional data (e.g., input data) including, but not limited to, data indicating the identity of the agent providing the input (e.g., an identity of an agent logged into the workstation 126 from which the input 204 is received), data identifying a type of statement 206 to inject into the call 202, and, in some implementations, data indicating a call in which the identified statement is to be injected. The statement 206 may be any phrase repeated often by the agent 120, for example, a greeting (e.g., "Hello. Thank you for calling USAA. My name is Daniel, how may I help you."), a goodbye (e.g., "Thank you for calling USAA, and have a good day."), a disclaimer (e.g., an insurance or financial security purchase disclaimer), disclosure messages, compliance messages, a conversation wrap-up (e.g., conversation summary and goodbye), or any other appropriate phrase, and may be indicated by the statement type data. Consequently, having the ability to inject statements 206 into calls 202 may reduce needless repetition by call center agents 120, and may increase overall efficiency of call centers by permitting agents 120 to interact with multiple callers 102, 104 concurrently. In addition, the average handle time for calls may be reduced, and thereby, reduce the computing resources required to maintain and monitor queued calls. In some examples, the statement 206 may be a recorded statement in the agent's 120 own voice. In some examples, the statement 206 may be a voice modulated statement, that is, computer generated speech modulated to sound like the agent's 120 voice.

The input data may be used by the speech injection system 124 to identify and select the agent's desired statement 206 from among a plurality of statements to be injected into the media stream of the call 202. For example, the statement type data may identify a greeting to be inserted into the media stream of the call 202. In some examples, agent identity input data may be used to identify recorded statements in the requesting agent's 120 voice from among a plurality of recorded statements in the voices of other agents in the call center. In some examples, agent identity input data may be used to identify voice modulation data (e.g., phoneme data) associated with the requesting agent's 120 voice from among a plurality of voice modulation data associated with the voices of other agents in the call center with which to modulate a computer generated statement.

During state (C), the speech injection system 124 obtains the statement 206 as indicated by the input 204 to be injected into the call 202. For example, speech injection system 124 obtains a statement 206 as identified by data associated with the input 204 and in voice of the agent 120 who submitted the input 204. Then, during state (D), the speech injection system 124 inserts (e.g., injects) the statement 206 into the media stream of the call 202. The statement 206 is injected into the media stream of the call 202 in real-time such that from the caller's 102 perspective the transition from conversation with the agent 120 to the injected speech is seamless.

As noted above, in some implementations, the statement 206 may be a recorded statement by the agent 120. The speech injection system 124 may, in such implementations, identify and access the appropriate file in which the recorded statement is stored, and inject the recorded statement into the media stream of the call 202. In such implementations, the agents working at the call center 106 may record various statements that each agent often repeats; the speech injection system 124 may store the recorded statements, and inject the recorded statements into the appropriate agent's calls.

As noted above, in some implementations, the statement 206 may be a predefined computer generated speech statement modulated with the agent's 120 voice. For example, in such implementations, the speech injection system 124 access a file containing a computer generated voice statement as identified by the input data (e.g., a text-to-speech (TTS) conversion of a standard call center greeting in a computer generated voice) and modulate the computer generated voice statement with the agent's 120 voice such that the statement sounds as if it was spoken in the agents voice. For example, the speech injection system 124 may gather samples of the agent's voice to obtain a sufficient number of phoneme combinations in order to synthesize the agent's voice. In some examples, the speech injection system 124 may sample the agent's voice during calls. In some examples, an agent 120 may read one or more training paragraphs designed to capture sufficient phoneme combinations to effectively modulate a TTS voice to synthesize the agent's voice. In such implementations, statements 206 may be stored as text files, converted to speech as needed using TTS techniques, and modulated with the appropriate agent's voice. In addition, the statements 206 may include a standard set of statements usable by all of the agents 120 at the call center.

In some implementations, the input data includes text entered by the agent 120. The speech injection system 124 may convert the textual statement entered by the agent into speech, e.g., using TTS techniques, and modulate the speech with the agent's 120 voice. Hence, in such implementations, agent's 120 can readily create customized statements 206 to be injected into calls as the need arises.

In some implementations, a speech injection application may permit an agent 120 to be involved in multiple calls at one time. For example, an agent 120 may be finishing a conversation with a first caller (e.g., caller 102). The speech injection application may permit the agent 120 to select a second call from a queue (e.g., a call from caller 104), and inject a statement 206 (e.g., a greeting in the agent's voice) into the second call while the agent 120 finishes the call with the first caller. In such implementations, call indication data may be used to identify the second call and insert the statement 206 into the media stream of the second call.

Figure 3:
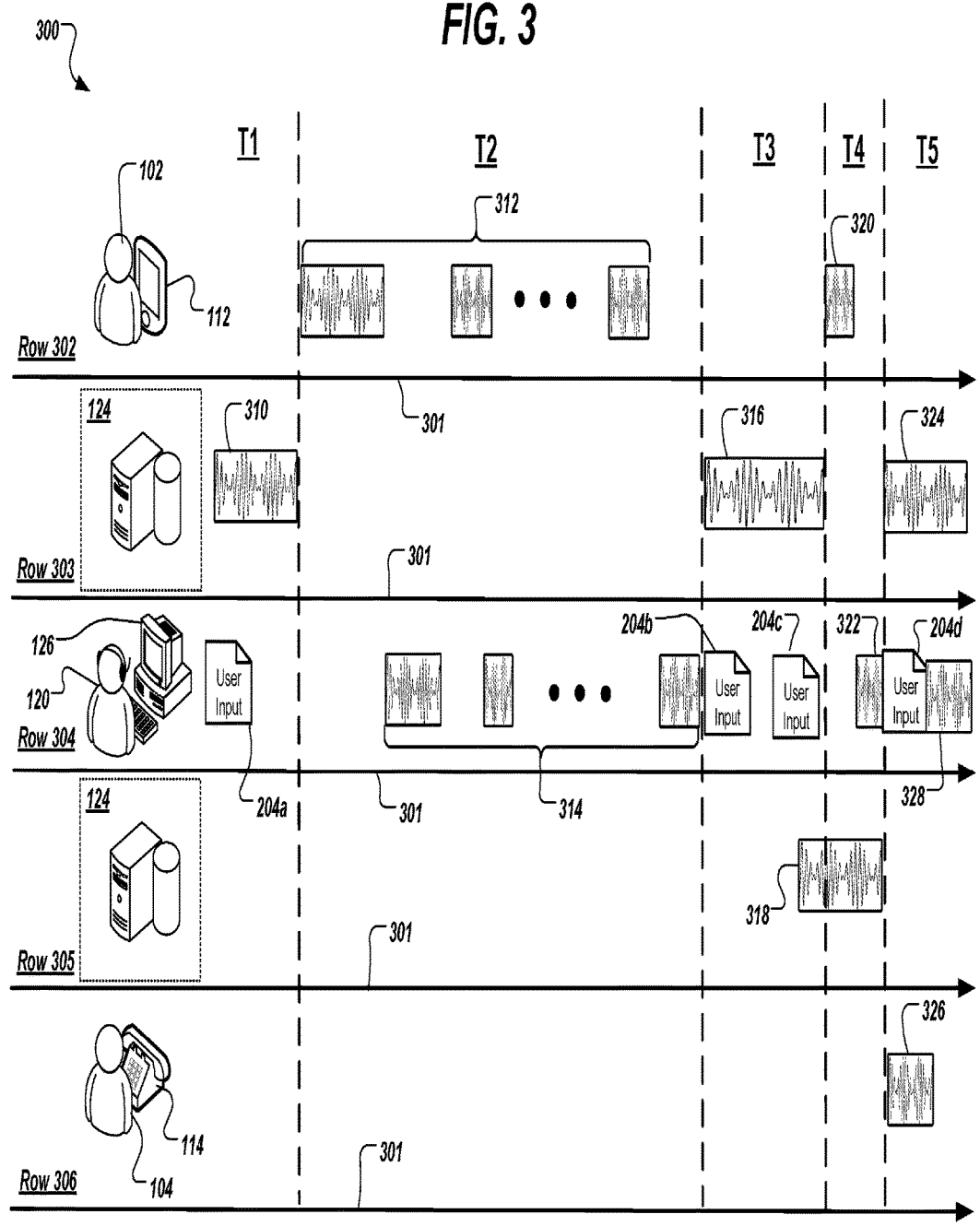
FIG. 3 depicts a timing diagram of example call center calls involving an example speech injection process in accordance with implementations of the present disclosure.

FIG. 3 depicts a timing diagram 300 of example call center calls involving example speech injection process 200 in accordance with implementations of the present disclosure. The timing diagram 300 includes axes 301 representing the progression of time from left to right and rows 302-306 representing utterances by caller 102, agent 120, and caller 104; and speech inserted into calls by speech injection system 124. Furthermore, rows 302-303 together represent an example first call between caller 102 and agent 120, and rows 303-306 together represent an example second call between caller 104 and the same agent 120. Although speech injection system 124 is shown twice, once in row 303 and once in row 305, the speech injection system 124 shown in both rows 303 and 305 represents the same speech injection system 124. The speech injection system 124 is shown twice to represent the speech injection system's 124 role in the first and the second call separately. That said, some implementations might include multiple speech injection systems 124.

The timing diagram 300 is further broken into five time periods, T1-T5. During time period T1, the first call, i.e., that between caller 102 and agent 120, is received at the call center and agent 120 submits input 204*a* instructing the speech injection system 124 to insert statement 310, e.g., a greeting in the agent's 120 voice, into the media stream of the first call. The transition between the inserted statement 310 in time period T1 and the subsequent conversation between the agent 120 and the caller 102 (e.g., as represented by the series of utterances 312 by caller 102 and utterances 314 by agent 120) in time period T2 appears seamless to the caller 102 due to the statement 310 being in the agent's 120 voice.

For example, the conversation during time period T2 may be about purchasing shares of a financial security, and therefore, the agent 120 may be required to provide the caller 102 with a disclosure regarding risks associated with such a purchase in order to finalize the transaction. Therefore, during time period T3, agent 120 submits input 204*b* instructing the speech injection system 124 to insert statement 316, e.g., a risk disclosure in the agent's 120 voice, into the media stream of the first call. Again, because the statement 316 is in the agent's 120 voice, the transition between the conversation in time period T2 and the inserted statement 316 in time period T3 appears seamless to the caller 102.

Then, knowing the call with caller 102 to be nearing an end, agent 120 submits input 204*c* instructing the speech injection system 124 to insert statement 318, e.g., a greeting in the agent's 120 voice, into the media stream of the second call, i.e., that between caller 102 and agent 120, for instance, in preparation for answering the second call from a call queue. As shown in the timing diagram 300, the injection of statement 318 into the second call occurs concurrently with a portion of the first call. Consequently, the speech injection system 124 may permit call center agents to manage at least portions of multiple calls simultaneously, e.g., speaking in one call while injecting statements into another call. For example, as shown in time period T4, caller 104 is listening to statement 318 in the agent's 120 voice while the agent 120 finishes the first call with caller 102 (e.g., as represented by utterance 320 by caller 102 and utterance 322 by agent 120).

Finally, during time period T5, agent 120 submits input 204*d* instructing the speech injection system 124 to insert statement 324, e.g., a goodbye in the agent's 120 voice, into the media stream of the first call, while beginning a conversation with caller 104 (e.g., as represented by utterance 326 by caller 104 and utterance 328 by agent 120).

Figure 4A:
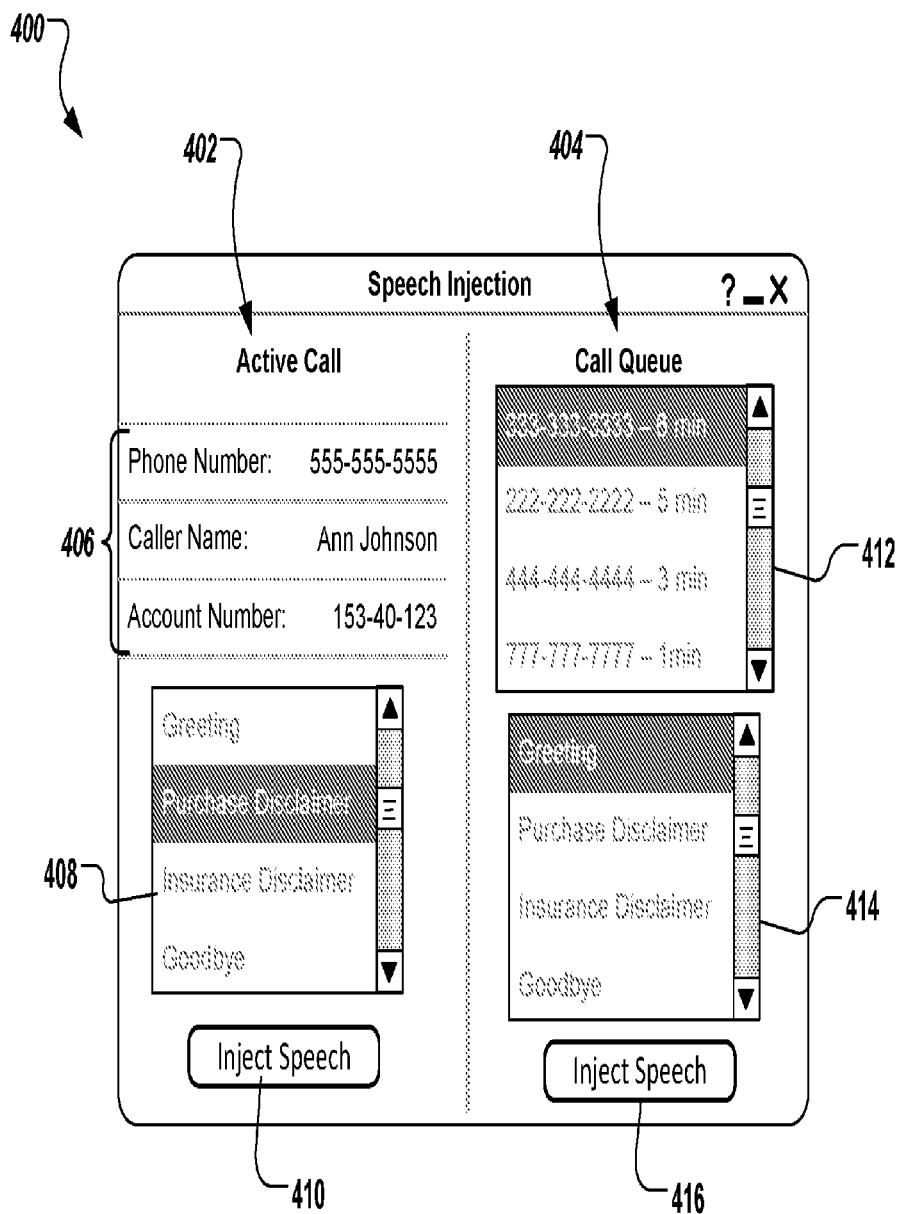
FIGS. 4A and 4B depict example graphical user interfaces (GUI) in accordance with implementations of the present disclosure.
Figure 4B:
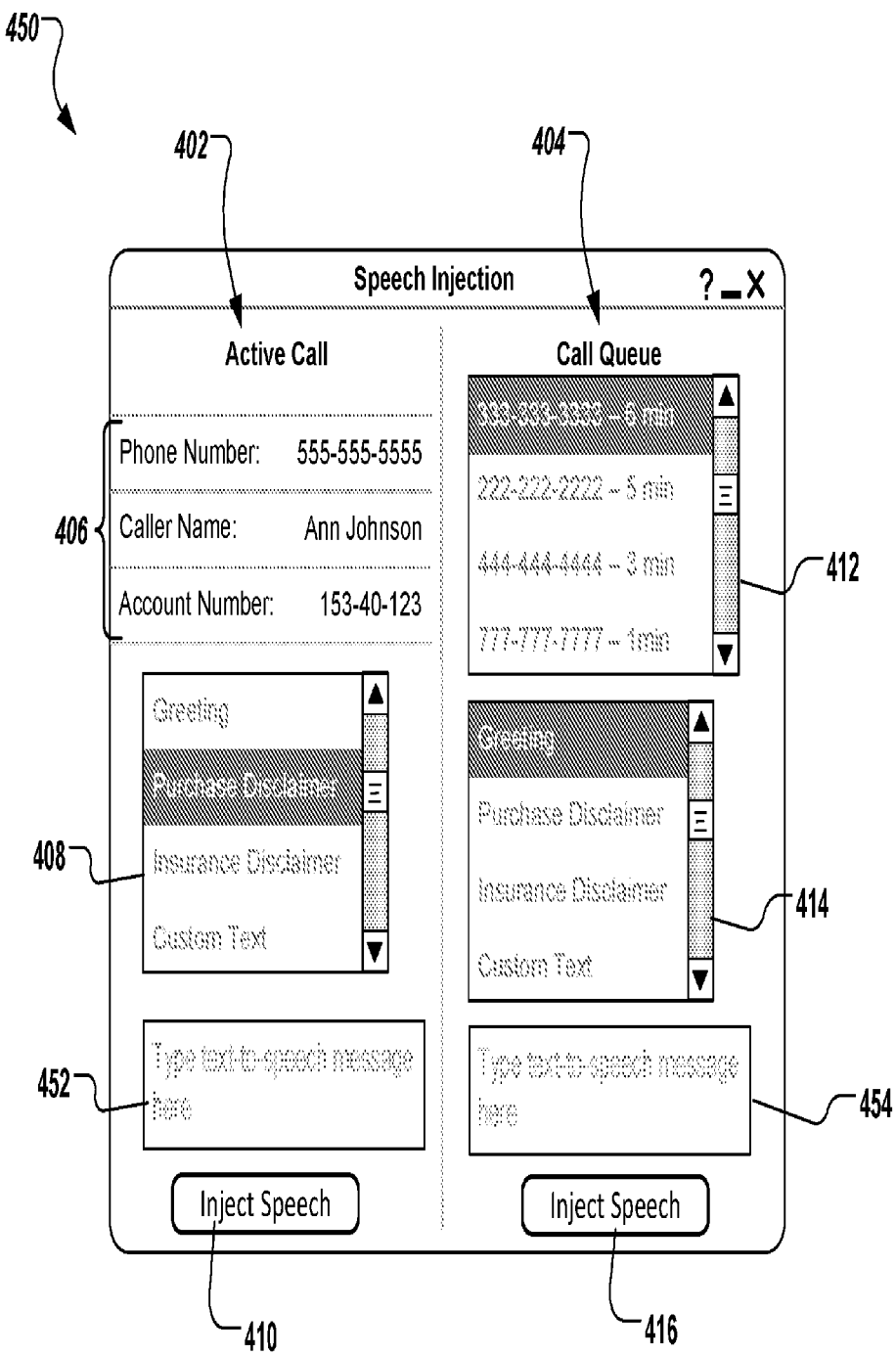

FIGS. 4A and 4B depict example graphical user interfaces (GUI) 400 and 450 in accordance with implementations of the present disclosure. For example, GUI's 400 and 450 may be included in a speech injection application and displayed on agent workstations 126. Referring to FIG. 4A, GUI 400 includes an active call portion 402 and a call queue portion 404. The active call portion 402 may permit a user to inject speech into an active call, e.g., a call center call in which the agent is actively participating. The call queue portion 404 may permit a call center agent to inject speech into one of multiple call center calls waiting to be answered in a call queue.

The active call portion 402 may include call information 406 associated with an active call, a statement type selection menu 408, and a speech injection control 410. While, the call queue portion 404 may include a call queue selection menu 412, a statement type selection menu 414, and a speech injection control 416. In some examples, call information 406 can include, but is not limited to, information such as a phone number of a caller (e.g., 555-555-5555), the caller's name (e.g., Ann Johnson), and an account number associated with the caller (e.g., 153-40-123).

In some examples, as described above, an agent may be permitted to select a specific type of statement to be injected into either an active call or a queued call using statement type selection menus 408 or 414. For example, an agent may choose from a greeting statement, a product purchase disclaimer, an insurance disclaimer, or a goodbye statement. Selection of the speech injection control 410 may cause the speech injection application to insert the selected statement (e.g., in menu 408) into the active call. When the agent selects speech injection control 410 data defining the agent's input may be sent from an agent workstation to a speech injection system. As noted above, the input data may include data identifying the agent submitting the speech injection input (e.g., so as to inject statements in the appropriate agent's voice). The input data also may include data identifying the type of statement the agent wishes to inject into the active call based on a selection statement type selected in menu 408 (e.g., the highlighted purchase disclaimer statement type).

In some examples, as described above, an agent may be permitted to select a pending call in a call queue in which to inject speech using menu 414. For example, as described in reference to FIG. 3 an agent may choose to inject speech into a call form a queue that the agent will answer upon and in anticipation of the completion of an active call. In some implementations, the agent may choose a call from a call queue menu 412 listing pending calls. In some implementations, the call queue menu may include an amount of time that each of the calls has been pending in the queue (e.g., the call from 333-333-3333 has been pending in the queue for 6 minutes).

Selection of the speech injection control 416 may then cause the speech injection application to insert the type of statement selected in menu 414 (e.g., a greeting) into the call selected in menu 412 (e.g., the call from phone number 333-333-3333). When the agent selects speech injection control 416 data defining the agent's input may be sent from an agent workstation to a speech injection system. The input data may include data identifying the call selected in menu 412 into which the statement is to be injected. In addition, as noted above, the input data may include data identifying the agent submitting the speech injection input (e.g., so as to inject statements in the appropriate agent's voice). The input data also may include data identifying the type of statement the agent wishes to inject into the selected call in the queue based on a selection statement type selected in menu 414 (e.g., the highlighted purchase disclaimer statement type).

Referring to FIG. 4B, GUI 450 is an example GUI which may be used in implementations that use agent voice data to modulate statements from computer generated TTS speech to obtain voice modulated statements synthesizing the agent's voice, as described above. GUI 450 is similar to GUI 400, but includes additional text entry boxes 452 and 454. The text entry boxes 452 and 454 may permit an agent to create statements for injection into an active call (box 452) or a queued call (box 454) in real-time. In other words, an agent may be able to type a TTS message that will be modulated with the agent's voice for insertion into call center calls. For example, an agent may enter (e.g., type) a textual statement into one of text entry boxes 452 or 454 and upon selecting one of speech injection controls 410 or 416 cause the textual statement to be converted to speech, modulated to synthesize the agents voice, and inserted into the media stream of a call (e.g., either an active call or a selected queued call).

In some implementations, menus 408 and 414 may vary for each agent in a call center. That is, menus 408 and 414 may include fewer, additional, or different statement types for different agents. For example, a GUI 400 or 450 for a call center agent who is not licensed to sell or discuss insurance products may not include an insurance disclaimer statement type. Similarly, for example, a GUI 400 or 450 for a call center agent who is licensed to sell or discuss market securities may include security risk disclaimer statement type. In some implementations, agents may be permitted to create personalized statement types, and therefore, menus 408 and 414 would include each agent's personalized statement types.

Figure 5:
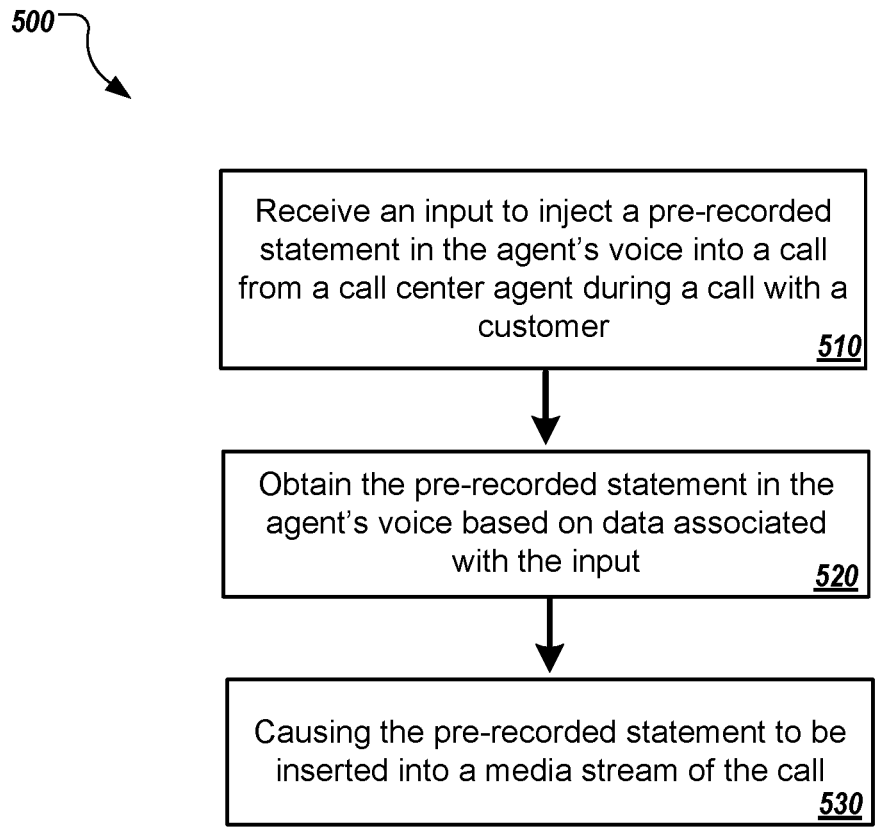
FIGS. 5 and 6 depict an example processes that can be executed in accordance with implementations of the present disclosure.

FIG. 5 depicts an example process 500 that can be executed in accordance with implementations of the present disclosure. In some examples, the example process 500 can be provided as one or more computer-executable programs executed using one or more computing devices. In some examples, the process 500 is executed to insert recorded statements into a media stream of a call center call. In some examples, the process 500 is executed by a speech injection application executing on a speech injection system.

An input from a call center agent is received during a call between the agent and a customer (510). The input directs one or more processors to inject a recorded statement in the agent's voice into the call. In response to receiving the input, a recorded statement is obtained based on data associated with the input (520). The recorded statement in the agent's voice is stored in a computer-readable file. The recorded statement in the agent's voice is caused to be inserted into a media stream of the call (530). For example, instructions to insert the recorded statement in the agent's voice into the media stream of the call may be provided to a computing system (e.g., a network edge device) to cause the recorded statement in the agent's voice to be inserted into the media stream of the call by the computing system (e.g., the network edge device). In some examples, a speech insertion system may insert the recorded statement in the agent's voice into the media stream of the call.

In some implementations, the recorded statement in the voice of the call center agent who submitted the input is obtained from a plurality of recorded statements. Recorded statements in the plurality of recorded statements may be recorded in voices of center agents other than the call center agent who submitted the input. Data associated with the input may include data identifying the agent, which data may be used to identify one or more recorded statements by the agent who submitted the input. For example, the pre-records statements of some or all of the agents who work at a call center may be stored in electronic data storage (e.g., a database) accessible to a speech injection system directly or via one or more networks.

In some implementations, the recorded statement in the voice of the call center agent who submitted the input is obtained from a plurality of recorded statements by the agent who submitted the input. Recorded statements in the plurality of recorded statements may various different types of recorded statements by the agent (e.g., greeting, disclaimer, and goodbye statements). Data associated with the input may include data identifying the type of statement requested by the agent, which data may be used to identify the type of statement requested by the agent from among the plurality of recorded statements.

In some implementations, a recorded statement may be inserted into a media stream of a call other the call in which the agent was engage when the agent submitted the input, i.e., a call in a call center queue. In such implementations, the data associated with the input may include data identifying the other call in which the recorded statement is to be inserted, and which may be used to identify the other call from among a plurality of calls in a queue.

In some implementations, a GUI (e.g., GUI 400 and/or 405) including a plurality of options for inserting speech into call center calls may be provided for display to the agent. The data associated with the input may be generated based on one or more options in of the plurality of options in the GUI selected by the agent.

Figure 6:
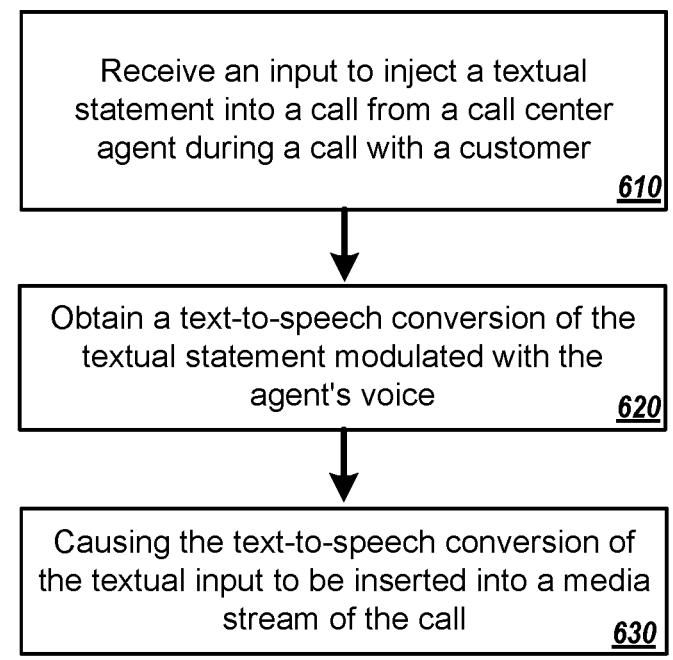

FIG. 6 depicts an example process 600 that can be executed in accordance with implementations of the present disclosure. In some examples, the example process 600 can be provided as one or more computer-executable programs executed using one or more computing devices. In some examples, the process 600 is executed to insert computer synthesized statements modulated with an agent's voice into a media stream of a call center call. In some examples, the process 600 is executed by a speech injection application executing on a speech injection system.

An input from a call center agent is received during a call between the agent and a customer (610). The input directs one or more processors to inject a statement into the call. In response to receiving the input, a voice modulated statement is obtained based on data associated with the input (620). The voice modulated statement is computer generated speech of the statement modulated with the agent's voice. The voice modulated statement is caused to be inserted into a media stream of the call (630). For example, instructions to insert the voice modulated statement into the media stream of the call may be provided to a computing system (e.g., a network edge device) to cause the voice modulated statement to be inserted into the media stream of the call by the computing system (e.g., the network edge device). In some examples, a speech insertion system may insert the voice modulated statement into the media stream of the call.

In some implementations, the voice modulation data associated with the voice of the call center agent who submitted the input is identified and selected from a plurality of voice modulation data associated voices of call center agents other than the call center agent. The voice modulation data associated with the agent may then be used to modulate computer generated speech of the statement that the agent wants to insert into the call. Data associated with the input may include data identifying the agent, which data may be used to identify voice modulation data associated with the agent who submitted the input. For example, voice modulation data associated with the voices of some or all of the agents who work at a call center may be stored in electronic data storage (e.g., a database) accessible to a speech injection system directly or via one or more networks. In some implementations, the voice modulation data associated with the agent's voice include a plurality of phoneme combinations of the agent's voice.

In some implementations, a voice modulated statement may be inserted into a media stream of a call other the call in which the agent was engage when the agent submitted the input, i.e., a call in a call center queue. In such implementations, the data associated with the input may include data identifying the other call in which the voice modulated statement is to be inserted, and which may be used to identify the other call from among a plurality of calls in a queue.

In some implementations, a GUI (e.g., GUI 400 and/or 405) including a plurality of options for inserting speech into call center calls may be provided for display to the agent. Some or all of the data associated with the input may be generated based on one or more options in of the plurality of options in the GUI selected by the agent.

In some implementations, data associated with the input includes a textual representation of a statement that the agent wants to inject into a call. In some examples, the text be entered into a text box in a GUI by the agent. Computer generated speech of the statement is obtained from a text-to-speech conversion of the textual representation of the statement. The computer generated speech of the statement is then modulated with the voice modulation data of the agent's voice.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer, storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by at least one processor, the method comprising:
   receiving, by the at least one processor, instructions directing the one or more processors to inject a statement into an electronic communication;
   obtaining, by the at least one processor and based on data associated with the instructions, text data representing the statement;
   in response to receiving the instructions, obtaining, by the at least one processor, a voice modulated statement, the voice modulated statement being computer generated speech of the text data modulated with a user's voice; and
   causing, by the at least one processor, a network device to insert the voice modulated statement into the electronic communication.

2. The method of claim 1, wherein the instructions are received during the electronic communication, and
   wherein causing the network device to insert the voice modulated statement into the electronic communication comprises causing the network device to insert the voice modulated statement into a media stream of the electronic communication.

3. The method of claim 1, wherein obtaining the voice modulated statement comprises:
   identifying voice modulation data associated with the user's voice from among a plurality of voice modulation data associated voices of users other than the user; and
   selecting the voice modulation data associated with the user's voice with which to modulate the computer generated speech of the statement.

4. The method of claim 3, wherein the voice modulation data associated with the user's voice includes a plurality of phoneme combinations of the user's voice.

5. The method of claim 1, wherein obtaining the voice modulated statement comprises:
   obtaining computer generated speech of the text data from a text-to-speech conversion of text data representing the statement; and
   causing the computer generated speech of the statement from the text-to-speech conversion to be modulated with the user's voice.

6. The method of claim 1, wherein the data associated with the instructions includes electronic communication data identifying another electronic communication into which the voice modulated statement is to be inserted, and
   wherein causing the voice modulated statement to be inserted into a media stream of the electronic communication comprises causing the voice modulated statement in the user's voice to be inserted into a media stream of the other electronic communication.

7. The method of claim 1, further comprising:
   providing, for display to the user, a graphical user interface including a plurality of options for inserting speech into electronic media streams,
   receiving, from the graphical user interface, a text message from the user, wherein the text message is the text data representing the statement to be inserted into the electronic communication.

8. The method of claim 1, wherein obtaining text data representing the statement comprises obtaining, from among a plurality of text files, a text file containing the text data representing the statement based the data associated with the instructions.

9. A system comprising:
   at least one processor; and a data store coupled to the at least one processor having instructions stored thereon which, when executed by the at least one processor, causes the at least one processor to perform operations comprising:
   receiving instructions directing the one or more processors to inject a statement into an electronic communication;
   obtaining, based on data associated with the instructions, text data representing the statement;
   in response to receiving the instructions, obtaining a voice modulated statement, the voice modulated statement being computer generated speech of the text data modulated with a user's voice; and
   causing a network device to insert the voice modulated statement into the electronic communication.

10. The system of claim 9, wherein the instructions are received during the electronic communication, and
    wherein causing the network device to insert the voice modulated statement into the electronic communication comprises causing the network device to insert the voice modulated statement into a media stream of the electronic communication.

11. The system of claim 9, wherein obtaining the voice modulated statement comprises:
    identifying voice modulation data associated with the user's voice from among a plurality of voice modulation data associated voices of users other than the user; and
    selecting the voice modulation data associated with the user's voice with which to modulate the computer generated speech of the statement.

12. The system of claim 11, wherein the voice modulation data associated with the user's voice includes a plurality of phoneme combinations of the user's voice.

13. The system of claim 9, wherein obtaining the voice modulated statement comprises:
    obtaining computer generated speech of the text data from a text-to-speech conversion of text data representing the statement; and
    causing the computer generated speech of the statement from the text-to-speech conversion to be modulated with the user's voice.

14. The system of claim 9, wherein the data associated with the instructions includes electronic communication data identifying another electronic communication into which the voice modulated statement is to be inserted, and
    wherein causing the voice modulated statement to be inserted into a media stream of the electronic communication comprises causing the voice modulated statement in the user's voice to be inserted into a media stream of the other electronic communication.

15. The system of claim 9, wherein the operations further comprise:
    providing, for display to the user, a graphical user interface including a plurality of options for inserting speech into electronic media streams,
    receiving, from the graphical user interface, a text message from the user, wherein the text message is the text data representing the statement to be inserted into the electronic communication.

16. The system of claim 9, wherein obtaining text data representing the statement comprises obtaining, from among a plurality of text files, a text file containing the text data representing the statement based the data associated with the instructions.

17. A non-transitory computer readable medium storing instructions that, when executed by one or more processors, cause the one or more processors to perform operations comprising:
receiving instructions directing the one or more processors to inject a statement into an electronic communication;
obtaining, based on data associated with the instructions, text data representing the statement;
in response to receiving the instructions, obtaining a voice modulated statement, the voice modulated statement being computer generated speech of the text data modulated with a user's voice; and
causing a network device to insert the voice modulated statement into the electronic communication.

18. The medium of claim 17, wherein obtaining the voice modulated statement comprises:
identifying voice modulation data associated with the user's voice from among a plurality of voice modulation data associated voices of users other than the user; and
selecting the voice modulation data associated with the user's voice with which to modulate the computer generated speech of the statement.

19. The medium of claim 18, wherein the voice modulation data associated with the user's voice includes a plurality of phoneme combinations of the user's voice.

20. The medium of claim 17, wherein obtaining the voice modulated statement comprises:
obtaining computer generated speech of the text data from a text-to-speech conversion of text data representing the statement; and
causing the computer generated speech of the statement from the text-to-speech conversion to be modulated with the user's voice.

\* \* \* \* \*

UNITED STATES PATENT AND TRADEMARK OFFICE
CERTIFICATE OF CORRECTION

PATENT NO. : 10,084,916 B2  
APPLICATION NO. : 15/874607  
DATED : September 25, 2018  
INVENTOR(S) : Vijay Jayapalan, Greg Yarbrough and Eric Smith Page 1 of 1

It is certified that error appears in the above-identified patent and that said Letters Patent is hereby corrected as shown below:

In the Claims

Column 16, Line 2, Claim 8, after "based" insert -- on --, therefore.

Column 17, Line 2, Claim 16, after "based" insert -- on --, therefore.

Signed and Sealed this  
Fifth Day of February, 2019

Andrei Iancu  
*Director of the United States Patent and Trademark Office*